US011499933B2

(12) United States Patent
Ryu et al.

(10) Patent No.: US 11,499,933 B2
(45) Date of Patent: Nov. 15, 2022

(54) METHOD FOR PREPARING GRAPHENE-TIN OXIDE NANOCOMPOSITE, AND GRAPHENE-TIN OXIDE NANOCOMPOSITE

(71) Applicants: LG Display Co., Ltd., Seoul (KR); Industry-University Cooperation Foundation Hanyang University, Seoul (KR)

(72) Inventors: Sung Pil Ryu, Paju-si (KR); Ki Seok Chang, Paju-si (KR); Wook Sung Kim, Paju-si (KR); Han Saem Kang, Paju-si (KR); Hyoun Woo Kim, Seongnam-si (KR); Yong Jung Kwon, Seoul (KR); Myong Sik Choi, Yangju-si (KR); Sung Yong Kang, Seoul (KR); Jae Hoon Bang, Hwaseong-si (KR)

(73) Assignees: LG DISPLAY CO., LTD., Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 476 days.

(21) Appl. No.: 16/613,395

(22) PCT Filed: May 17, 2018

(86) PCT No.: PCT/KR2018/005651
§ 371 (c)(1),
(2) Date: Nov. 13, 2019

(87) PCT Pub. No.: WO2018/216952
PCT Pub. Date: Nov. 29, 2018

(65) Prior Publication Data
US 2020/0166469 A1    May 28, 2020

(30) Foreign Application Priority Data
May 24, 2017    (KR) .................. 10-2017-0064108

(51) Int. Cl.
*C01B 32/194*    (2017.01)
*C01G 19/02*    (2006.01)
(Continued)

(52) U.S. Cl.
CPC .......... *G01N 27/127* (2013.01); *B01J 19/126* (2013.01); *C01B 32/194* (2017.08);
(Continued)

(58) Field of Classification Search
CPC ..... G01N 27/127; G01N 27/12; B01J 19/126; B01J 2219/0879; B01J 2219/1206;
(Continued)

(56) References Cited

FOREIGN PATENT DOCUMENTS

| JP | 2016-514080 A | 5/2016 |
|---|---|---|
| KR | 10-1466310 B | 11/2014 |

(Continued)

OTHER PUBLICATIONS

Schwenke, Almut M., Stephanie Hoeppener, and Ulrich S. Schubert. "Synthesis and modification of carbon nanomaterials utilizing microwave heating." Advanced Materials 27.28 (2015): 4113-4141.*
(Continued)

*Primary Examiner* — Richard M Rump
(74) *Attorney, Agent, or Firm* — Polsinelli PC

(57) ABSTRACT

A method of manufacturing a graphene-tin oxide nanocomposite comprises dispersing graphene and tin oxide in an organic solvent to prepare a dispersion solution, drying the dispersion solution to obtain a powdery mixture, and irradiating the mixture with microwaves to obtain a graphene-tin oxide nanocomposite. Irradiation of graphene and tin oxide with microwaves results in the simplification of the manufacturing process of graphene-tin oxide nanocomposites and a decrease in manufacturing time and cost, and produce graphene-tin oxide nanocomposites at low tempera-
(Continued)

tures. Further, the graphene-tin oxide nanocomposite with improved sensitivity to NO2 gas may be produced.

17 Claims, 8 Drawing Sheets

(51) Int. Cl.
    *G01N 27/12*     (2006.01)
    *B01J 19/12*     (2006.01)

(52) U.S. Cl.
    CPC ....... *C01G 19/02* (2013.01); *B01J 2219/0879* (2013.01); *B01J 2219/1206* (2013.01); *C01P 2004/03* (2013.01)

(58) Field of Classification Search
    CPC ..... C01B 32/19; C01B 32/194; C01B 32/184; C01B 2204/00; C01G 19/02; C01P 2004/03; C01P 2004/45; C01P 2006/62; C01P 2006/64; B82Y 40/00
    See application file for complete search history.

(56) References Cited

FOREIGN PATENT DOCUMENTS

| KR | 10-2015-0122653 A | 11/2015 |
|---|---|---|
| KR | 10-2016-0023312 A | 3/2016 |
| KR | 10-2016-0139906 A | 12/2016 |

OTHER PUBLICATIONS

English machine translation of KR20160023312 (2016).*
Wen, Zhuliang, et al. "The improved electrocatalytic activity of palladium/graphene nanosheets towards ethanol oxidation by tin oxide." Electrochimica Acta 56.1 (2010): 139-144.*
Fu, Diyu, et al. "Two-dimensional net-like SnO 2/ZnO heteronanostructures for high-performance H 2 S gas sensor." Journal of Materials Chemistry A 4.4 (2016): 1390-1398.*
Yi Xia, et al., "Confined Formation of Ultrathin ZnO Nanorods/ Reduced Graphene Oxide Mesoporous Nanocomposites for High-Performance Room-Temperature NO2 Sensors", ACS Applied Materials & Interfaces, Research Article, www.acsami.org, ACS Publications, 2016 American Chemical Society, DOI: 10.1021/acsami.6b12501, ACS Appl. Mater Interfaces 2016, 8, 35454-35463 (pp. 11).
Nantikan Tammanoon, et al., "Ultrasensitive NO2 Sensor Based on Ohmic Metal-Semiconductor Interfaces of Electrolytically Exfoliated Graphene/Flame-Spray-Made SnO2 Nanoparticles Composite Operating at Low Temperatures", ACS Applied Materials & Interfaces, Research Article, www.acsami.org, ACS Publications, 2015 American Chemical Society, DOI: 10.1021/acsami.5b09067, ACS Appl. Mater Interfaces 2015, 7, 24338-24352 (pp. 16).
Hyoung woo KIM, et al., "Microwave-Assisted Synthesis of Graphene-SnO2 Nanocomposites and Their Applications in Gas Sensors", ACS Applied Materials & Interfaces, Research Article, www.acsami. org, ACS Publications, 2017 American Chemical Society, DOI: 10.1021/acsami.7b02533, ACS Appl. Mater Interfaces 2017, 7, 31667-31682 (pp. 17).
International Search Report from International Application No. PCT/KR2018/005651 in 2 pages.
Korean Notice of Allowance dated Sep. 27, 2021 issued in corresponding Patent Application No. 10-2017-0064108 w/English Abstract (8 pages).

* cited by examiner

METHOD FOR PREPARING GRAPHENE-TIN OXIDE NANOCOMPOSITE, AND GRAPHENE-TIN OXIDE NANOCOMPOSITE

CROSS REFERENCE TO RELATED APPLICATIONS

This application is a 35 U.S.C. 371 national stage filing of International Application No. PCT/KR2018/005651 filed on May 17, 2018, which claims priority to Korean Patent Application No. 10-2017-0064108 filed on May 24, 2017, which the contents of the aforementioned applications are hereby incorporated by reference in their entirety.

BACKGROUND

Filed of the Disclosure

The present disclosure relates to a method for manufacturing graphene-tin oxide nanocomposite and graphene-tin oxide nanocomposite manufactured by the method.

Description of the Background

Gas sensors for detecting toxic gas, explosive gas, environmentally harmful gas, etc. are important in many fields including health care, national defense, environment, and the like. Presently, researches are consistently ongoing on the gas sensors. In particular, researches are being carried out on the semiconductor gas sensor wherein a metal oxide film is used as a gas sensitive material.

In general, a semiconductor gas sensor comprises a substrate, an electrode and a gas-sensing layer formed on the substrate. In this regard, the substrate is made of silicon, silica, alumina, or the like, and the electrode is made of metal such as platinum (Pt) and gold (Au). The gas-sensing layer is made of the metal oxide film. The semiconductor gas sensor detects the types, concentration, etc. of a gas based on the change in electrical resistance of the metal oxide film resulting from adsorption and oxidation/reduction reaction of the gas molecules on the surface of the metal oxide film (gas-sensitive material). In general, metal oxide as the gas-sensitive material used in the semiconductor gas sensor includes metal materials such as zinc oxide (ZnO), tin oxide (SnO2), tungsten oxide (WO3) titanium oxide (TiO2), or indium oxide (In2O3). Among the above-described metal oxides, tin oxide (SnO2) is more widely used for a gas sensor because it is more sensitive and selective to gas molecules than other metal oxides.

However, using only a metal oxide as the gas-sensing layer has limitations in improving sensitivity and susceptibility to gas.

Recently, efforts are being made to increase the specific surface area of the gas-sensing layer in order to improve gas sensitivity. To this end, the gas-sensing layer is formed of nanocomposites. For example, nanocomposites in which tin oxide and graphene are combined may also be used.

Meanwhile, the graphene-tin oxide nanocomposite can be produced by a nanocomposite manufacturing method which is applied in other fields. For example, a hydrothermal synthesis method can be used. More specifically, the graphene-metal oxide nanocomposite can be produced by hydrothermal synthesis method in which a synthetic material such as a graphite powder, a metal precursor, a pH modifier, and a surfactant is prepared, then they are mixed with distilled water at a high temperature, and they are thermally reacted to form a graphene-metal oxide nanocomposite.

However, in order to perform the conventional hydrothermal synthesis method, a step of converting the graphite into graphene is separately required, and at this time, a high temperature is required. Further, since the hydrothermal synthesis process also requires a high temperature of 500□C or more, there is a problem that it is difficult to carry out the synthesis process to such a high temperature. Further, since the process time is increased by the temperature raising rate for adjusting the temperature required for the hydrothermal synthesis, there is a problem that the process cost is increased. Further, the surfactant added to the graphite powder solution has a problem in that unnecessary side reaction is accompanied, resulting in negative effects on the physical properties of the nanocomposite.

Accordingly, an object to be solved by the present disclosure is to provide a method for manufacturing a graphene-tin oxide nanocomposite in which the method can be carried out at a low temperature and can be simplified.

Another object of the present disclosure is to provide a method for manufacturing a graphene-tin oxide nanocomposite in which the manufacturing cost can be reduced.

Still another object of the present disclosure is to provide a graphene-tin oxide nanocomposite which is highly sensitive to nitrogen oxide gas and a gas sensor using the same.

Objects of the present disclosure are not limited to the above-mentioned objects, and other objects, which are not mentioned above, can be clearly understood by those skilled in the art from the following descriptions.

In order to achieve the above object, the method of manufacturing a graphene-tin oxide nanocomposite according to an exemplary aspect of the present disclosure comprises dispersing graphene and tin oxide in an organic solvent to prepare a dispersion solution, drying the dispersion solution to obtain a powdery mixture, and irradiating the mixture with microwaves to obtain a graphene-tin oxide nanocomposite. Irradiation of graphene and tin oxide with microwaves results in the simplification of the manufacturing process of graphene-tin oxide nanocomposites and a decrease in manufacturing time and cost, and produce graphene-tin oxide nanocomposites at low temperatures. Further, the graphene-tin oxide nanocomposite with improved sensitivity to NO2 gas may be produced.

Other detailed matters of the exemplary aspects are included in the detailed description and the drawings.

The present disclosure can simplify the manufacturing process of the graphene-tin oxide nanocomposites and reduce the manufacturing time and cost by irradiating microwave to the powdery graphene and tin oxide.

The present disclosure can produce graphene-tin oxide nanocomposites at low temperature.

The present disclosure can improve the sensitivity and the susceptibility of the graphene-tin oxide nanocomposites to NO2 gas.

The effects according to the present disclosure are not limited to the contents exemplified above, and more various effects are included in the present specification.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
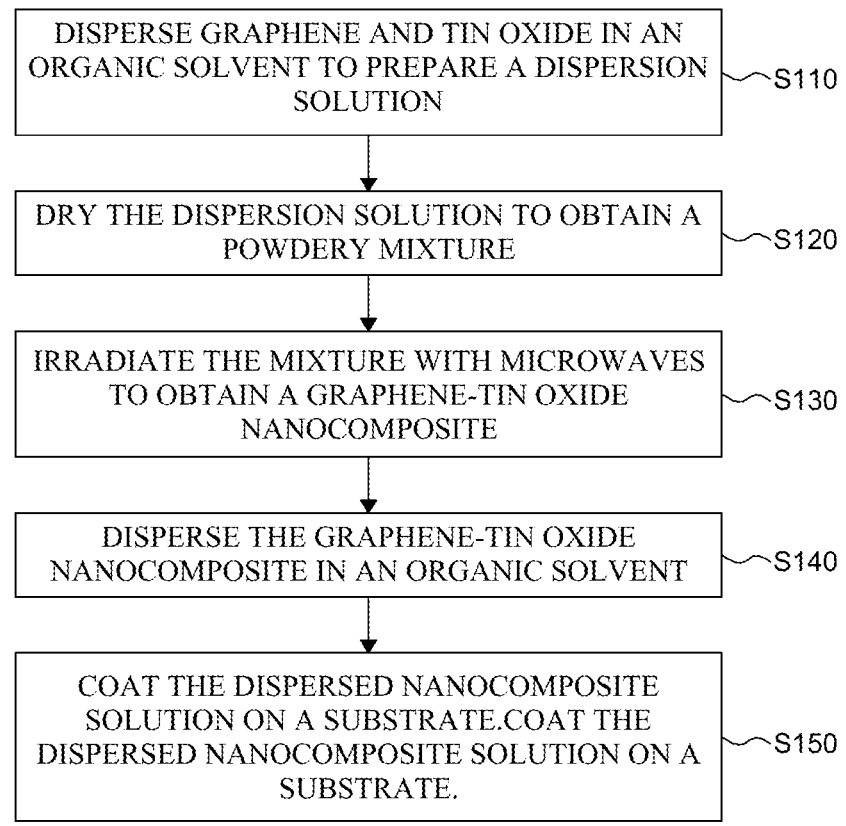
FIG. 1 is a flowchart illustrating a method of manufacturing a graphene-tin oxide nanocomposite according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereinafter, a display device according to exemplary aspects of the present disclosure will be described in detail with reference to accompanying drawings FIG. 1 is a flowchart illustrating a method of manufacturing a graphene-tin oxide nanocomposite according to an exemplary aspect of the present disclosure. Referring to FIG. 1, the method of manufacturing a graphene-tin oxide nanocomposite according to an exemplary aspect of the present disclosure comprises: dispersing graphene and tin oxide in an organic solvent to prepare a dispersion solution (S110), drying the dispersion solution to obtain a powdery mixture (S120), irradiating the mixture with microwaves to obtain a graphene-tin oxide nanocomposite (S130), dispersing the graphene-tin oxide nanocomposite in an organic solvent (S140), and coating the dispersed nanocomposite solution on a substrate (S150).

First, the graphene and tin oxide are dispersed in an organic solvent to prepare a dispersion solution (S110).

Graphene and tin oxide may be used in powder form. Graphene and tin oxide in powder form is uniformly dispersed in an organic solvent. By dispersing graphene and tin oxide in an organic solvent, graphene and tin oxide can be uniformly mixed rather than simply mixing graphene and tin oxide in powder form, and the performance of the resulting graphene-tin oxide nano-structure can be improved.

Meanwhile, graphene and tin oxide may be mixed with an organic solvent and then ultrasonicated in the process of dispersing graphene and tin oxide.

The content ratio of graphene to tin oxide may be 0.1:99.9 to 5:95, or 0.5:99.5 to 1:99, based on the solid content, but is not limited thereto. When the content ratio of graphene and tin oxide falls within the above range, the electrical conductivity of the tin oxide is sufficient so that the sensitivity of the finally formed graphene-tin oxide nanostructure to the gas can be improved. Particularly, when the content of graphene is less than the above range, the effect of rapid temperature elevating by microwave irradiation is small, and the formation of secondary particles of tin oxide may be difficult. On the other hand, when the content of graphene is higher than the above range, the graphene aggregation causes a decrease in the degree of dispersion so that the sensitivity to gas may be reduced.

The organic solvent is not particularly limited as long as it is a solvent capable of dispersing graphene and tin oxide. For example, the organic solvent may be an alcohol-based organic solvent such as ethanol and glycol.

The dispersion solution is dried to obtain a powdery mixture (S120).

The dispersion solution containing graphene and tin oxide produced in the step of S110 is dried. In order to dry the dispersion solution, a method of applying heat or reducing the pressure can be used. There is an uneconomical aspect because the method of evaporating the solvent by applying heat requires a temperature rising process. Accordingly, a method of reducing the pressure of the dispersion solution is more preferable. Specifically, the dispersion solution prepared in the step of S110 may be immediately dried using a suction funnel such as an aspirator to obtain a mixture of graphene and tin oxide in powder form.

The mixture is irradiated with microwaves to obtain a graphene-tin oxide nanocomposite (S130).

Specifically, the mixture of graphene and tin oxide obtained in the step S120 is placed in a container, and the microwave is directly irradiated thereto. The mixture of graphene and tin oxide in powder form can be quickly and uniformly heated by directly irradiating the mixture with the microwave. Further, if the microwave is used, the heating rate is very fast as compared with the heating manner using a reflux device, and the entire mixture of graphene and tin oxide is uniformly heated, thereby remarkably shortening the reaction time.

Although not limited thereto, the microwave may be irradiated with an output of 500 w to 2000 w. When the output of the microwave falls within the above range, it is possible to reduce the reaction time by applying sufficient energy to the mixture of graphene and tin oxide in a short period of time, and to prevent crystal and structural change of graphene and tin oxide.

Further, although not limited thereto, the microwave may be irradiated for 1 minute to 10 minutes. When the irradiation time of the microwave falls within the above range, the sufficient energy can be applied to the graphene and the tin oxide without being damaged.

As described above, the graphene-tin oxide nanocomposite is formed by irradiating the microwave directly to the mixture of graphene and tin oxide obtained by drying the dispersion solution. Hereinafter, the graphene-tin oxide nanocomposite prepared according to an exemplary aspect of the present disclosure is described.

Figure 2:
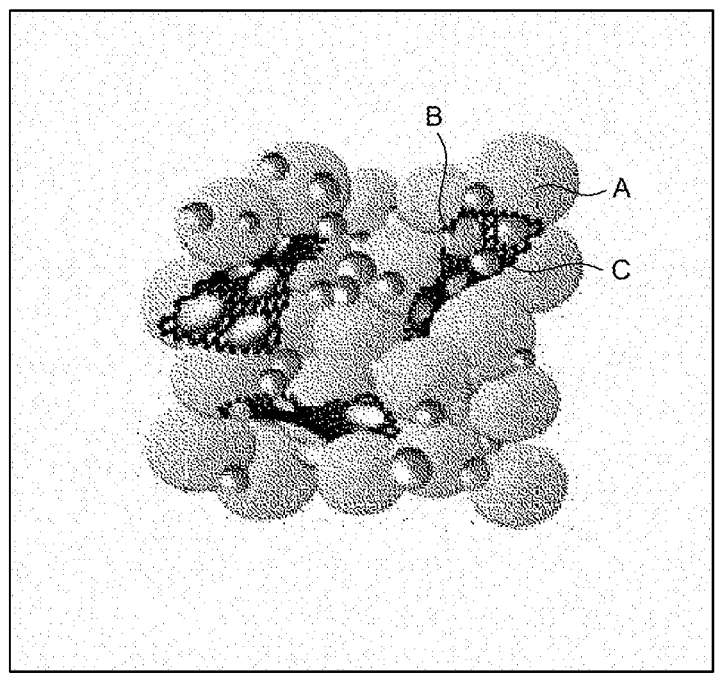
FIG. 2 is a schematic view of a graphene-tin oxide nanocomposite according to an exemplary aspect of the present disclosure.

FIG. 2 is a schematic view of a graphene-tin oxide nanocomposite according to an exemplary aspect of the present disclosure. Referring to FIG. 2, the graphene-tin oxide nanocomposite according to an exemplary aspect of the present disclosure includes graphene (C) and tin oxide, and has a structure in which tin oxide is adsorbed or disposed on the surface of graphene (C). In this regard, the tin oxide is positioned on the graphene surface as primary particles (A) and secondary particles (B).

The primary particles (A) of tin oxide are crystalline particles originating from powdery tin oxide initially used in the production of nanocomposites. In other words, it is a crystal of tin oxide which retains the initial tin oxide formation as it is. On the other hand, the secondary particles (B) of tin oxide are crystalline particles in which tin oxide is temporarily vaporized by microwaves during the production of the nanocomposite and then solidified by adsorption on the surface of graphene (C). The secondary particles (B) of tin oxide have a size of 1 nm to 20 nm, and have a significantly smaller size than the primary particles (A) having a size of several hundreds of nm. The secondary particles of tin oxide can significantly improve the sensitivity to gas compared to a mixture of graphene and tin oxide, which is simply composed of only primary particles.

The structure of the graphene-tin oxide nanocomposite including the primary particles and secondary particles of tin oxide can be identified directly by scanning electron microscope (SEM) images.

Figure 3A:
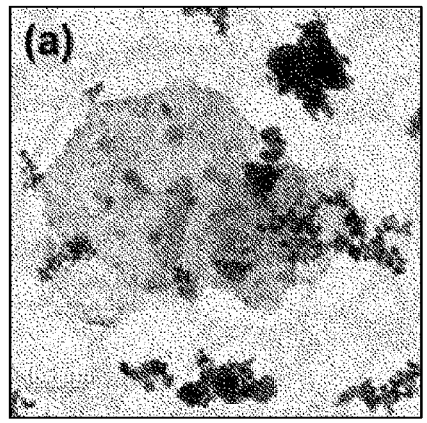
FIGS. 3A and 3B are SEM (scanning electron microscope) images of a graphene-tin oxide nanocomposite according to an exemplary aspect of the present disclosure.
Figure 3B:
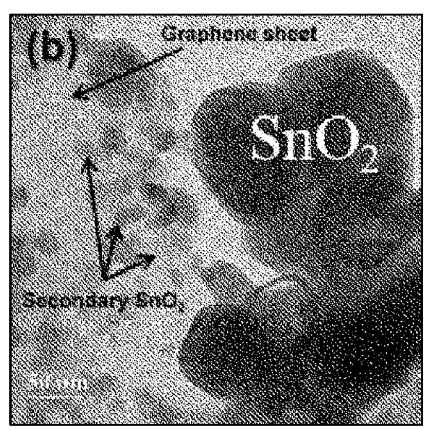

FIGS. 3A and 3B are scanning electron microscope (SEM) images of a graphene-tin oxide nanocomposite according to an exemplary aspect of the present. Specifically, FIG. 3A is an SEM image of a micrometer scale, and FIG. 3B is an SEM image of a nanometer scale.

Referring to FIG. 3B, it can be confirmed that the primary particles of tin oxide having a size of 100 nm or more are positioned, and secondary particles of tin oxide having a size of 10 nm to 20 nm are formed on the surface of the graphene.

Meanwhile, the graphene-tin oxide nanocomposite produced by the manufacturing method according to an exemplary aspect of the present disclosure has a structure in which tin atoms are inserted at interstitial sites between particles. Specifically, a microwave is irradiated to a mixture of graphene and tin oxide to partially decompose tin oxide to form tin atoms. These tin atoms may be inserted at interstitial sites between each tin oxide and graphene particles. These tin atoms act as a defect and help the prepared graphene-tin oxide nanocomposite adsorb $NO_2$ gas. More specifically, tin atoms inserted at interstitial sites as defects are more unstable than other surrounding atoms, and thus have relatively higher energy than other surrounding atoms, resulting in better adsorption to $NO_2$. Accordingly, the gas sensor including the graphene-tin oxide nanocomposite prepared by the manufacturing method according to an exemplary aspect of the present disclosure may significantly improve the sensitivity to $NO_2$ compared to a gas sensor including a conventional tin oxide or a gas sensor including a graphene-tin oxide nanocomposite prepared by the conventional hydrothermal synthesis.

In order to form a film-typed or coated graphene-tin oxide nanocomposite, the method of manufacturing a graphene-tin oxide nanocomposite according to an exemplary aspect of the present disclosure may further include dispersing the graphene-tin oxide nanocomposite in an organic solvent (S140) and coating the dispersed nanocomposite solution on a substrate (S150). Through this process, a gas sensor including a graphene-tin oxide nanocomposite can be produced.

Specifically, referring again to FIG. 1, the graphene-tin oxide nanocomposite prepared in step of S130 is dispersed in an organic solvent (S140). Thereafter, the dispersed nanocomposite solution is coated on the substrate using a spraying method, a screen printing method, an inkjet method, a spin coating method, a solution casting method, or the like (S150). The film containing the graphene-tin oxide nanocomposite can be produced through a further process of drying the coated solution.

The method of manufacturing a graphene-tin oxide nanocomposite according to an exemplary aspect of the present disclosure employs the irradiation of graphene and tin oxide with microwave, thereby simplifying the preparation process of the graphene-tin oxide nanocomposite and manufacturing the graphene-tin oxide nanocomposite at low temperature. Therefore, there are effects of remarkably reducing manufacturing time and cost.

Further, the graphene-tin oxide nanocomposite prepared by the method for manufacturing a graphene-tin oxide nanocomposite according to an exemplary aspect of the present disclosure includes secondary particles of tin oxide and tin atoms inserted at interstitial sites between particles. As a result, its sensitivity to $NO_2$ gas can be significantly improved as compared with a gas sensor including conventional tin oxide.

Hereinafter, a gas sensor including a graphene-tin oxide nanocomposite prepared by a method of manufacturing a graphene-tin oxide nanocomposite according to an exemplary aspect of the present disclosure is described.

Figure 4:
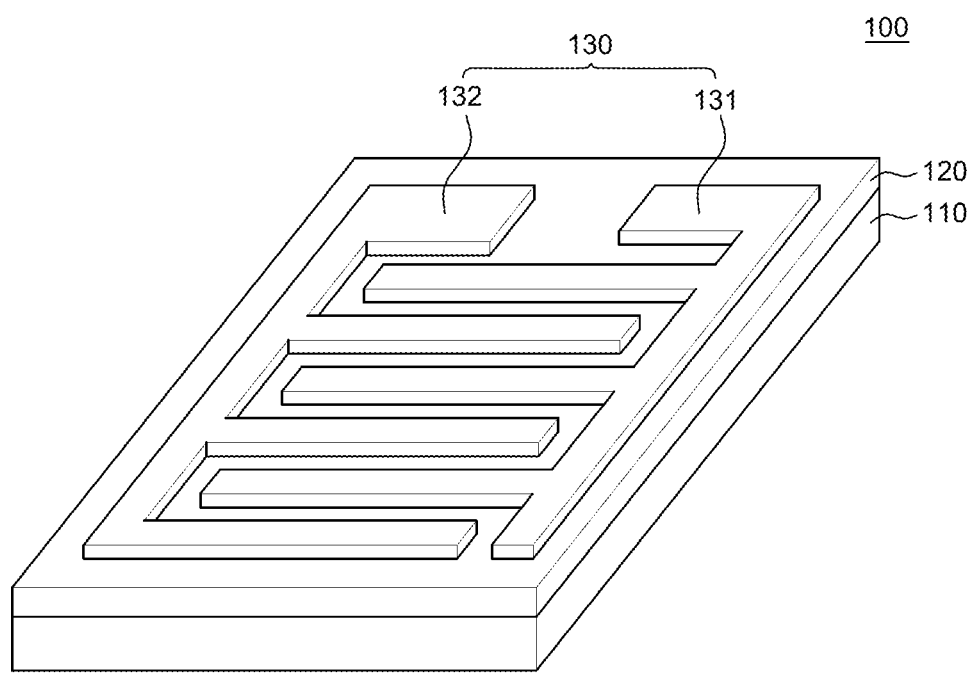
FIG. 4 is a perspective view illustrating a gas sensor including a graphene-tin oxide nanocomposite according to an exemplary aspect of the present disclosure.

FIG. 4 is a perspective view illustrating a gas sensor including a graphene-tin oxide nanocomposite according to an exemplary aspect of the present disclosure. Referring to FIG. 4, the gas sensor 100 according to an exemplary aspect of the present disclosure includes a substrate 110, a gas-sensing layer 120 and an electrode 130 formed on the substrate 110.

The substrate 110 may support the gas-sensing layer 120 and the electrode 130. For example, the substrate 110 may be selected from glass, quartz, a metal oxide, a plastic film, and the like, but is not limited thereto. Further, the substrate 110 may have a thickness of 0.05 mm to 10 mm, but is not limited thereto.

The gas-sensing layer 120 can sense gas. The gas sensor according to an exemplary aspect of the present disclosure uses a graphene-tin oxide nanocomposite as the gas sensing layer 120. The gas sensing layer 120 comprising a graphene-tin oxide nanocomposite is excellent in sensitivity to nitrogen oxide gas (NOx). Further, the gas-sensing layer 120 may further include at least one metal oxide selected from the group consisting of tungsten oxide (WO3), tin oxide (SnO2), niobium oxide (Nb2O5), zinc oxide (ZnO), indium oxide (In2O3), iron oxide (Fe2O3), titanium oxide (TiO2), cobalt oxide (Co2O3) and gallium oxide (Ga2O3) in addition to the graphene-tin oxide nanocomposite, but is not limited thereto.

The gas-sensing layer 120 may have a thickness of 5 μm or less, or 1 nm to 1000 nm, but is not limited thereto.

The electrode 130 may be a conductive material, for example, a metal or a metal oxide. Specifically, the material constituting the electrode 130 may include at least one metal or its oxide selected from the group consisting of indium (In), tin (Sn), zinc (Zn), aluminum (Al), niobium (Nb), titanium (Ti), gold (Au), gallium (Ga), and the like, but is not limited thereto. Further, the electrode 130 may be formed of a double layer structure or a triple layer structure in which a plurality of materials is stacked, or a mixed layer in which two materials are mixed.

The electrode 130 may have a thickness of 1 nm to 1 μm, but is not limited thereto.

The electrode 130 may be formed on the substrate 110 or on the gas-sensing layer 120 by deposition and may be formed through, for example, a sputter deposition method, an electron beam deposition method, a chemical vapor deposition method, a wet deposition method or the like. In this regard, the electrode 130 may have various types of patterns. FIG. 5 shows an exemplary pattern of electrode 130. The electrode 130 may have an interdigitated electrode (IDE) pattern as illustrated in FIG. 5. Specifically, the electrode 130 is formed on the gas-sensing layer 120 in a shape in which the first pattern 131 and the second pattern 132 having a finger shape (or a comb shape) are engaged with each other as illustrated in FIG. 5. Meanwhile, FIG. 5 illustrates a structure in which the electrode 130 is disposed on the gas-sensing layer 120, but the electrode 130 may be disposed directly on the substrate 110 in the same plane as the gas-sensing layer 120.

Hereinafter, the present disclosure is described in more detail with reference to Examples. However, the following Examples are for illustrative purposes only, and the scope of the present disclosure is not limited by the following Examples.

Example: Preparation of Graphene-Tin Oxide Nanocomposite and Production of Gas Sensor First, 9.95 g of tin oxide powder (manufactured by Daejung chemical & materials Co. LTD in South Korea) and 0.05 g of graphene powder were dispersed in ethanol (500 ml). An aspirator was used to collect only powder from the dispersed solution. The collected powder was dried in vacuum for 24 hours to obtain a powdery mixture of graphene and tin oxide. The mixture was placed in an alumina vessel and irradiated with a microwave of 1 kW output for 5 minutes to prepare graphene-tin oxide nanocomposites.

The prepared graphene-tin oxide nanocomposites were re-dispersed in ethanol, and the result was spray-coated on a SiO2 substrate heated at 140° C. to 160° C. to form a gas-sensing layer. An electrode was deposited on the gas-sensing layer through a sputtering process (Emitech, K575X) of Ti 50 nm/Au 300 nm to produce a gas sensor having a shape of SiO2/gas-sensing layer/electrode.

Comparative Example 1

The tin oxide powder (manufactured by Daejung chemical & materials Co. LTD in South Korea) was dispersed in ethanol, and the result was spray-coated on a SiO2 substrate heated at 140° C. to 160° C. to form a gas-sensing layer. An electrode was deposited on the gas-sensing layer through a sputtering process (Emitech, K575X) of Ti 50 nm/Au 300 nm to produce a gas sensor.

Comparative Example 2

First, 9.95 g of tin oxide powder (manufactured by Daejung chemical & materials Co. LTD in South Korea) and 0.05 g of graphene powder were dispersed in ethanol (500 ml), and the result was spray-coated on a SiO2 substrate heated at 140° C. to 160° C. to form a gas-sensing layer. An electrode was deposited on the gas-sensing layer through a sputtering process (Emitech, K575X) of Ti 50 nm/Au 300 nm to produce a gas sensor.

Experimental Example 1: Evaluation of Sensitivity to NO2 Gas

Figure 5A:
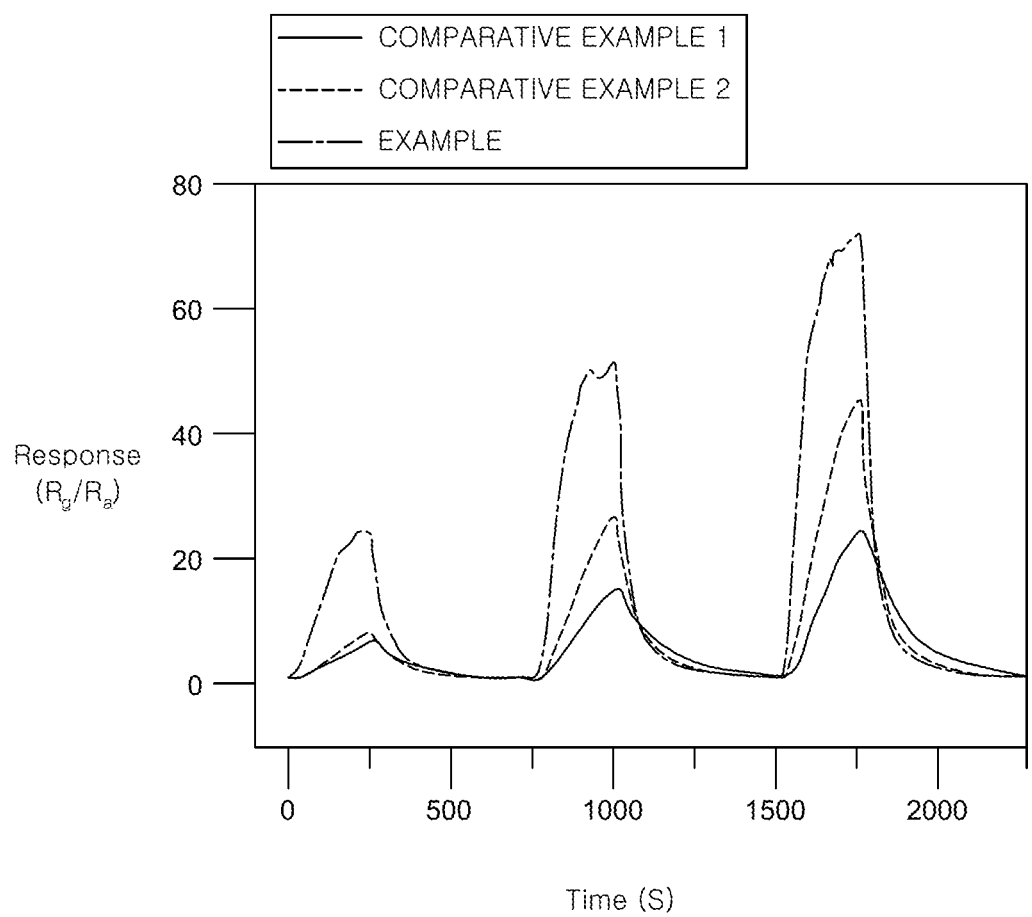
FIGS. 5A to 5D are graphs showing the results of evaluating the sensitivity, the sensitive time, and the recovery time for the NO2 gas of the gas sensors according to Examples and Comparative Examples of the present disclosure.

The sensitivity to NO2 gas was evaluated for the gas sensors according to the above-described Example, Comparative Example 1 and Comparative Example 2. Specifically, dry air and NO2 gas flowed to the manufactured gas sensors through a mass flow controller (MJ Technics, Model MR-5000-4channels). The change in the resistance of the sensor was measured in dry air and NO2 gas conditions using a multimeter (Keithley, Model 2400 Series SourceMeter). FIG. 5A is a graph showing results of sensitivity evaluation according to NO2 gas concentration, and FIG. 5B is a graph showing sensitivity according to the sensitivity change by NO2 gas concentration.

First, as shown in FIG. 5A, in the case of Comparative Example 1 in which the gas-sensing layer of the gas sensor was made of tin oxide, the response to the NO2 gas was insignificant. Meanwhile, it was confirmed that in the case of Comparative Example 2 in which the gas-sensing layer was formed by mixing graphene and tin oxide without irradiation of microwaves, the response to the NO2 gas was somewhat increased as compared with Comparative Example 1, but the sensitivity was significantly insufficient compared to Example 1.

Figure 5B:
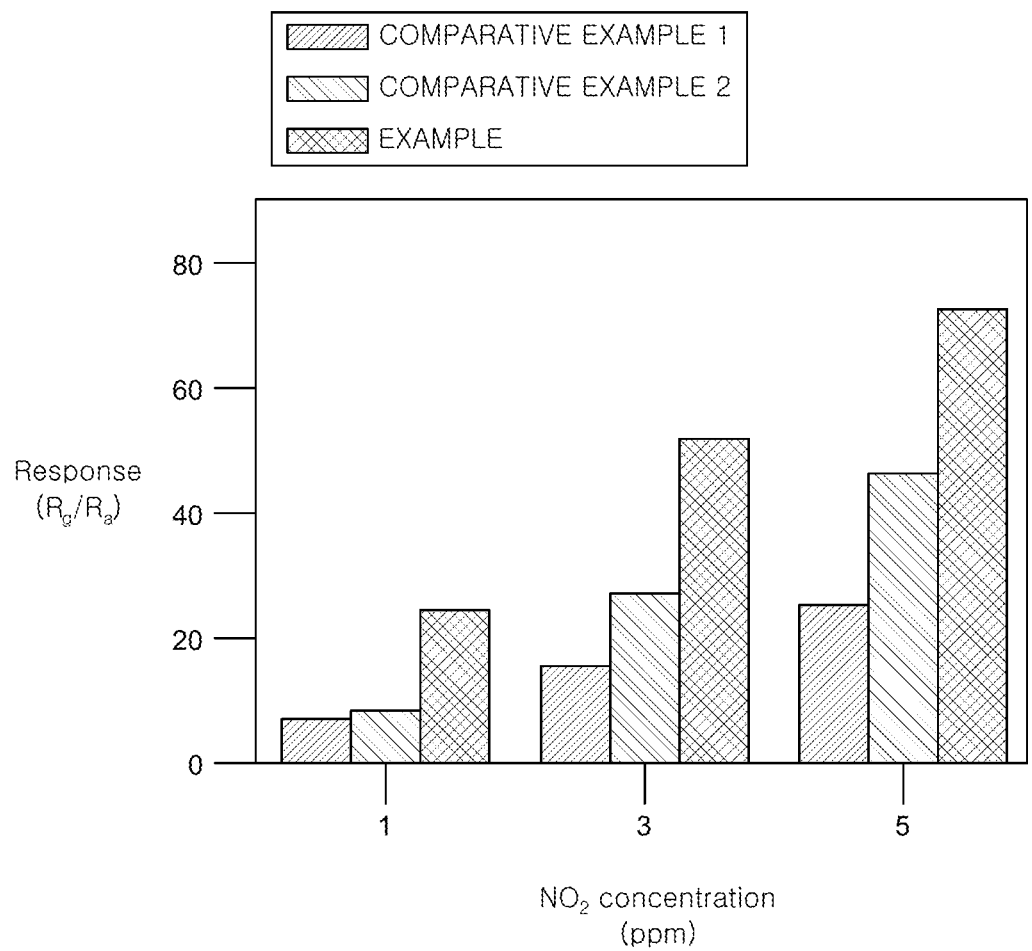

Further, as shown in FIG. 5B, it can be confirmed that the gas sensor including the graphene-tin oxide nanocomposite according to an exemplary aspect of the present disclosure had a significant response to the NO2 gas according to the concentration thereof, compared to gas sensors according to Comparative Example 1 and Comparative Example 2.

Figure 5C:
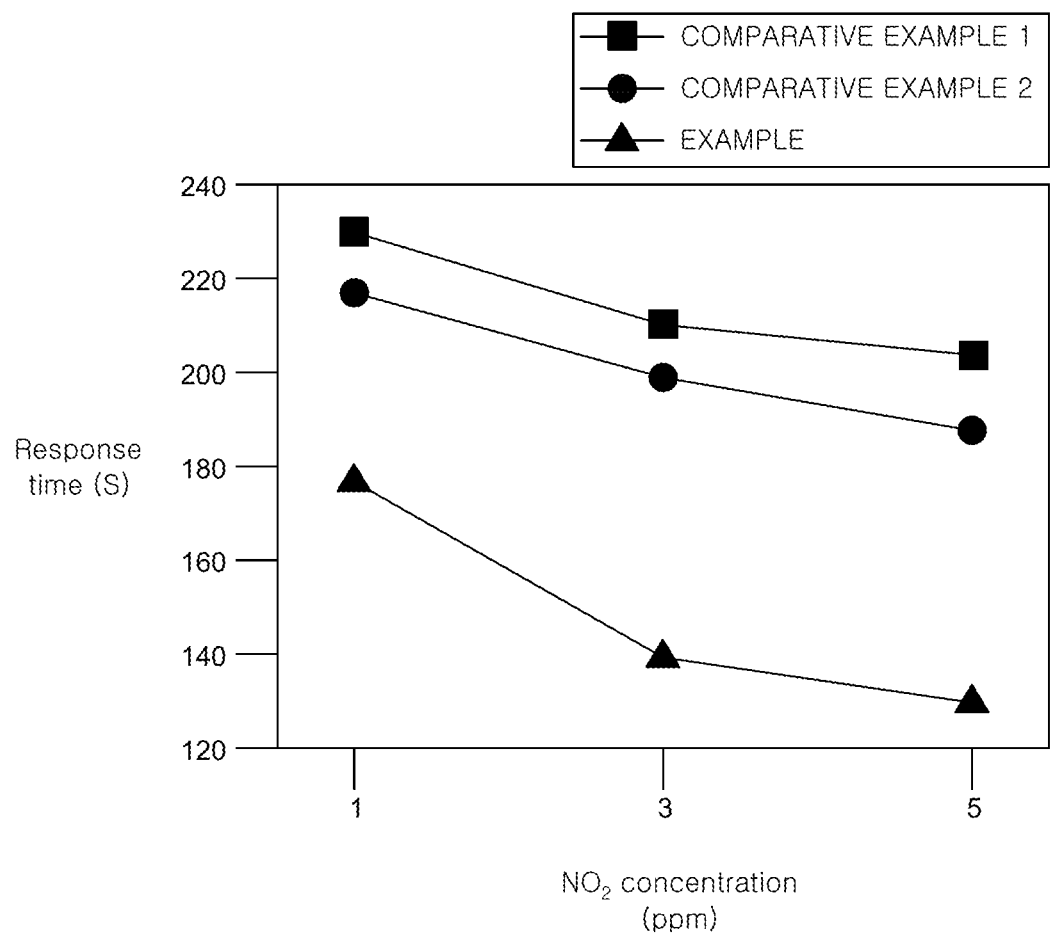
Figure 5D:
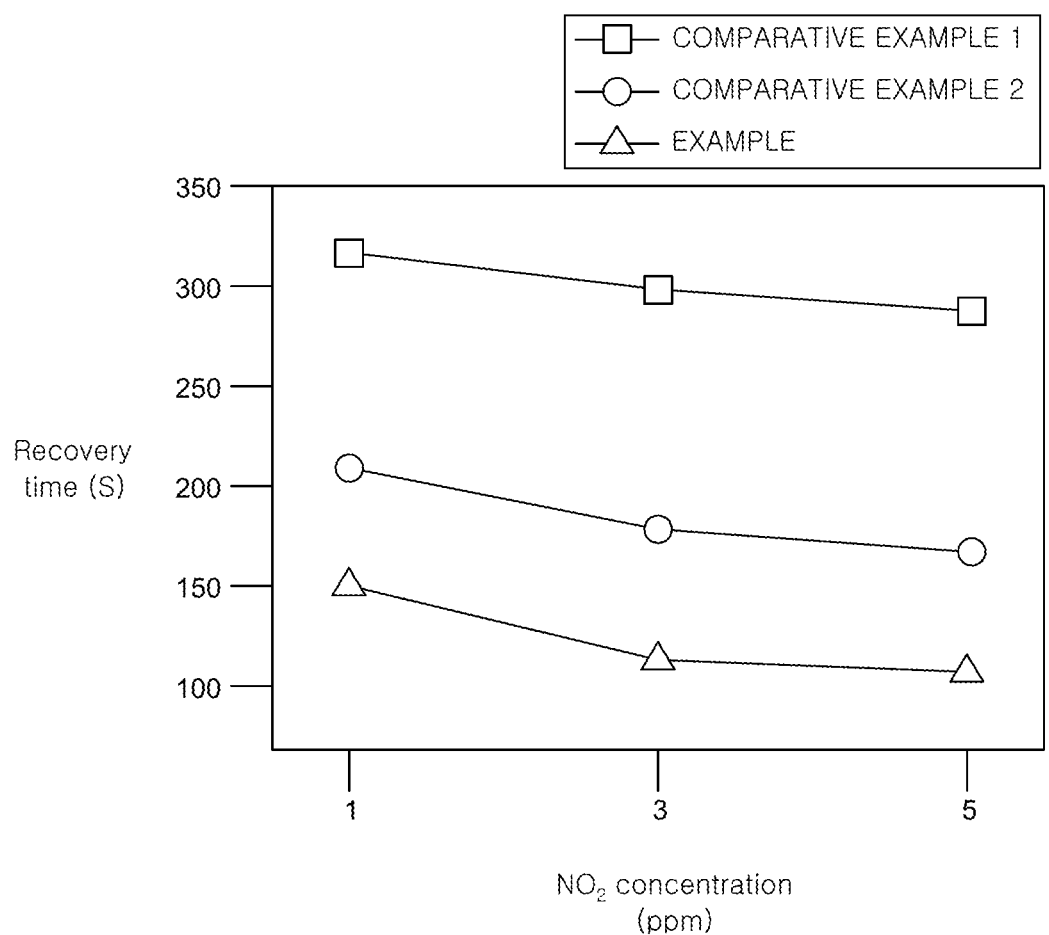

Experimental Example 2: Evaluation of the Sensitive Time and Recovery Time for NO2 Gas The gas sensors according to the Example, Comparative Example 1 and Comparative example 2 were evaluated for the sensitive time and recovery time for NO2 gas. Specifically, the sensitive time for NO2 gas was measured as the time taken for the resistance of the gas sensor to rise to 90% of the initial resistance according to the NO2 gas concentration. Further, the recovery time for NO2 gas was measured as the time taken for the resistance value of the gas sensor to decrease to 90% level of the maximum resistance value measured when NO2 gas was present, after removal of NO2 gas. FIG. 5C is a graph showing the sensitive time of the gas sensor according to the NO2 gas concentration, and FIG. 5D is a graph showing the recovery time of the gas sensor according to the NO2 gas concentration.

Referring to FIG. 5C, when the gas sensors according to the Example, Comparative Example 1 and Comparative Example 2 were exposed to the NO2 gas with the same concentration, the gas sensor of Example rapidly adsorbed the NO2 to quickly detect the gas compared with those of Comparative Example 1 and Comparative Example 2. In other words, it can be confirmed that the sensitivity of Example is excellent. Referring to FIG. 5D, it can be seen that, when the gas sensor according to Example was exposed to dry air, NO2 that has been adsorbed can be discharged quickly, and the gas sensor can be activated again in a short time.

The exemplary aspects of the present disclosure can also be described as follows:

According to an aspect of the present disclosure, there is provided a method of manufacturing a graphene-tin oxide nanocomposite. The method comprises dispersing graphene and tin oxide in an organic solvent to prepare a dispersion solution, drying the dispersion solution to obtain a powdery mixture, and irradiating the mixture with microwaves to obtain a graphene-tin oxide nanocomposite.

The graphene and the tin oxide may be in powder form.

The content ratio of the graphene and the tin oxide may be 0.1:99.9 to 5:95 based on the solid content.

The microwave may be irradiated at an output of 500 w to 2000 w.

The microwave may be irradiated for 1 minute to 10 minutes.

The organic solvent may be an alcohol-based solvent.

The method comprises dispersing the graphene-tin oxide nanocomposite in an organic solvent and coating the dispersed nanocomposite solution on a substrate.

According to another aspect of the present disclosure, there is provided a graphene-tin oxide nanocomposite. The graphene-tin oxide nanocomposite may comprise a primary particle of tin oxide and a secondary particle of tin oxide.

A tin atom may be inserted at an interstitial site.

According to yet another aspect of the present disclosure, there is provided a gas sensor including the graphene-tin oxide nanocomposite.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:

1. A method of manufacturing a graphene-tin oxide nanocomposite, the method comprising:
   dispersing graphene and tin oxide in an organic solvent to prepare a dispersion solution;
   drying the dispersion solution to obtain a powdery mixture; and
   irradiating the powdery mixture with microwaves to obtain the graphene-tin oxide nanocomposite,
   wherein the graphene-tin oxide nanocomposite comprises a primary particle having a size of several hundreds of nm of tin oxide and a secondary particle having a size of 1 nm to 20 nm of tin oxide.

2. The method of claim 1, wherein the graphene and the tin oxide are in a powder form.

3. The method of claim 1, wherein a solid content ratio of the graphene and the tin oxide ranges from 0.1:99.9 to 5:95.

4. The method of claim 1, wherein the microwave is irradiated at an output of 500 W to 2000 W.

5. The method of claim 1, wherein the microwave is irradiated for 1 minute to 10 minutes.

6. The method of claim 1, wherein the organic solvent includes an alcohol-based solvent.

7. The nanocomposite of claim 1, wherein a tin atom is inserted at an interstitial site.

8. A gas sensor including a graphene-tin oxide nanocomposite, comprising:
   a substrate;
   a gas sensing layer disposed on the substrate and comprising a graphene-tin oxide nanocomposite having a solid content ratio of the graphene and the tin oxide ranges from 0.1:99.9 to 5:95, wherein the graphene-tin oxide nanocomposite has a tin atom inserted at an interstitial site; and
   a conductive electrode disposed on one of on the substrate and the gas sensing layer,
   wherein the graphene-tin oxide nanocomposite comprises a primary particle having a size of several hundreds of nm of tin oxide and a secondary particle having a size of 1 nm to 20 nm of tin oxide.

9. The gas sensor of claim 8, wherein the conductive electrode has an interdigitated shape.

10. The gas sensor of claim 8, wherein the gas sensing layer further comprises at least one metal oxide.

11. The gas sensor of claim 10, wherein the at least one metal oxide is selected from the group consisting of tungsten oxide (WO3), tin oxide (SnO2), niobium oxide (Nb2O5), zinc oxide (ZnO), indium oxide (In2O3), iron oxide (Fe2O3), titanium oxide (TiO2), cobalt oxide (Co2O3) and gallium oxide (Ga2O3).

12. The gas sensor of claim 8, wherein the graphene-tin oxide nanocomposite comprises a primary particle of tin oxide and a secondary particle of tin oxide.

13. A method of manufacturing a graphene-tin oxide nanocomposite, the method comprising:
   dispersing graphene powder and tin oxide powder in a first organic solvent to prepare a dispersion solution;
   drying the dispersion solution to obtain a powdery mixture;
   irradiating the powdery mixture with microwaves to obtain the graphene-tin oxide nanocomposite;
   dispersing the graphene-tin oxide nanocomposite in a second organic solvent; and coating the dispersed nanocomposite solution on a substrate, wherein the graphene-tin oxide nanocomposite comprises a primary particle having a size of several hundreds of nm of tin oxide and a secondary particle having a size of 1 nm to 20 nm of tin oxide.

14. The method of claim 13, wherein a solid content ratio of the graphene and the tin oxide ranges from 0.1:99.9 to 5:95.

15. The method of claim 13, wherein the microwave is irradiated at an output of 500 W to 2000 W.

16. The method of claim 13, wherein the microwave is irradiated for 1 minute to 10 minutes.

17. The method of claim 13, wherein the organic solvent includes an alcohol-based solvent.

\* \* \* \* \*